(12) United States Patent
Toyama

(10) Patent No.: US 11,845,182 B2
(45) Date of Patent: Dec. 19, 2023

(54) ENCODER UNIT, DRIVE DEVICE, AND ROBOT

(71) Applicant: Seiko Epson Corporation, Tokyo (JP)

(72) Inventor: Mitsuru Toyama, Azumino (JP)

(73) Assignee: SEIKO EPSON CORPORATION

( * ) Notice: Subject to any disclaimer, the term of this patent is extended or adjusted under 35 U.S.C. 154(b) by 196 days.

(21) Appl. No.: 17/456,384

(22) Filed: Nov. 24, 2021

(65) Prior Publication Data

US 2022/0161416 A1 May 26, 2022

(30) Foreign Application Priority Data

Nov. 26, 2020 (JP) .................................. 2020-195901

(51) Int. Cl.
*B25J 9/00* (2006.01)
*B25J 13/08* (2006.01)
(Continued)

(52) U.S. Cl.
CPC ............ *B25J 9/0009* (2013.01); *B25J 13/08* (2013.01); *B25J 19/021* (2013.01); *B25J 19/027* (2013.01);
(Continued)

(58) Field of Classification Search
CPC . B25J 9/0009; B25J 13/08; B25J 13/00; B25J 13/087; B25J 13/088; B25J 13/089; B25J 19/027; B25J 19/021; G01D 5/12; G01D 5/125; G01D 5/14; G01D 5/142; G01D 5/145; G01D 5/147; G01D 5/244; G01D 5/245; G01D 5/2451; G01D 5/2452; G01D 5/32; G01D 5/34; G01D 5/347; G01D 5/34707; G01D 5/34715; G01D 5/3473; G01D 5/54; G01D 5/56; G01D 5/58; G01P 3/44; G01P 3/486; G01P 3/487; H02K 11/22; H02K 11/21; H02K 11/215

See application file for complete search history.

(56) References Cited

U.S. PATENT DOCUMENTS 6,683,545 B2   1/2004   Strasser
8,624,453 B2 *  1/2014   Yoshidomi ............. H02K 11/22
                                                   310/68 B (Continued)

FOREIGN PATENT DOCUMENTS

CN     207832208 U     9/2018
CN     111795709 A     10/2020

(Continued)

*Primary Examiner* — John R Lee
(74) *Attorney, Agent, or Firm* — Harness, Dickey & Pierce, P.L.C.

(57) ABSTRACT

An encoder unit includes a magnetic encoder having a main gear fixed to a rotation shaft, a plurality of auxiliary gears meshing with the main gear, magnets placed in the respective auxiliary gears, and a plurality of magnetic sensors on which magnetic fields of the corresponding magnets act, an optical encoder placed apart from the magnetic encoder in an axial direction of the rotation shaft and having an optical scale fixed to the rotation shaft and an optical sensor receiving light reflected by the optical scale, and a substrate placed between the magnets and the optical scale and having one surface with the magnetic sensors mounted thereon and another surface with the optical sensor mounted thereon.

9 Claims, 3 Drawing Sheets

(51) Int. Cl.
  *B25J 19/02* (2006.01)
  *G01D 5/14* (2006.01)
  *G01D 5/347* (2006.01)

(52) U.S. Cl.
  CPC ........... *G01D 5/145* (2013.01); *G01D 5/3473* (2013.01); *G01D 5/34715* (2013.01)

(56) References Cited

U.S. PATENT DOCUMENTS

| | | | |
|---|---|---|---|
| 9,904,380 B2* | 2/2018 | Park | G06F 3/0362 |
| 11,506,679 B2* | 11/2022 | Toyama | G01P 3/443 |
| 2013/0015333 A1* | 1/2013 | Miyajima | G01D 5/3473 |
| | | | 250/215 |
| 2016/0209241 A1* | 7/2016 | Mitsuhashi | G01D 5/145 |
| 2019/0375113 A1* | 12/2019 | Maeda | B25J 18/00 |
| 2020/0319224 A1 | 10/2020 | Toyama | |
| 2021/0023697 A1* | 1/2021 | Watanabe | B25J 9/04 |
| 2022/0161416 A1* | 5/2022 | Toyama | B25J 13/08 |
| 2022/0171362 A1* | 6/2022 | Imai | G05B 19/402 |
| 2023/0198346 A1* | 6/2023 | Poole | B25J 13/088 |
| | | | 29/598 |

FOREIGN PATENT DOCUMENTS

| | | |
|---|---|---|
| JP | 2004-515758 A | 5/2004 |
| JP | 2018-136257 A | 8/2018 |

* cited by examiner

ENCODER UNIT, DRIVE DEVICE, AND ROBOT

The present application is based on, and claims priority from JP Application Serial Number 2020-195901, filed Nov. 26, 2020, the disclosure of which is hereby incorporated by reference herein in its entirety.

BACKGROUND

1. Technical Field

The present disclosure relates to an encoder unit, a drive device, and a robot.

2. Related Art

JP-A-2018-136257 discloses an encoder that detects a rotation angle of a rotation shaft of a motor from output of an optical encoder and a magnetic encoder. The optical encoder has an optical scale unit fixed to the rotation shaft of the motor and an optical sensor detecting the rotation state of the optical scale unit, and the optical sensor is mounted on a first substrate. The magnetic encoder has a main gear fixed to the rotation shaft, two auxiliary gears meshing with the main gear, magnets fixed to the respective auxiliary gears, and two magnetic sensors detecting the rotation states of the respective magnets, and the two magnetic sensors are mounted on a second substrate. The main gear and the auxiliary gears, the second substrate, the optical scale unit, and the first substrate are sequentially arranged from the motor side.

However, in the encoder having the above described configuration, the optical sensor and the magnetic sensor are mounted on the separate substrates and the plurality of substrates are necessary, and there is a problem that thickness reduction of the encoder is difficult.

SUMMARY

An encoder unit according to an aspect of the present disclosure includes a magnetic encoder having a main gear fixed to a rotation shaft, a plurality of auxiliary gears meshing with the main gear, magnets placed in the respective auxiliary gears, and a plurality of magnetic sensors on which magnetic fields of the corresponding magnets act, an optical encoder placed apart from the magnetic encoder in an axial direction of the rotation shaft and having an optical scale fixed to the rotation shaft and an optical sensor receiving light reflected by the optical scale, and a substrate placed between the magnets and the optical scale and having one surface with the magnetic sensors mounted thereon and another surface with the optical sensor mounted thereon.

A drive device according to an aspect of the present disclosure includes the above described encoder unit, and a motor having the rotation shaft.

A robot according to an aspect of the present disclosure includes a first member, a second member displaced relative to the first member, and the above described drive device displacing the second member relative to the first member.

DESCRIPTION OF EXEMPLARY EMBODIMENTS

As below, an encoder unit, a drive device, and a robot according to the present disclosure will be explained in detail with reference to preferred embodiments shown in the accompanying drawings.

Figure 1:
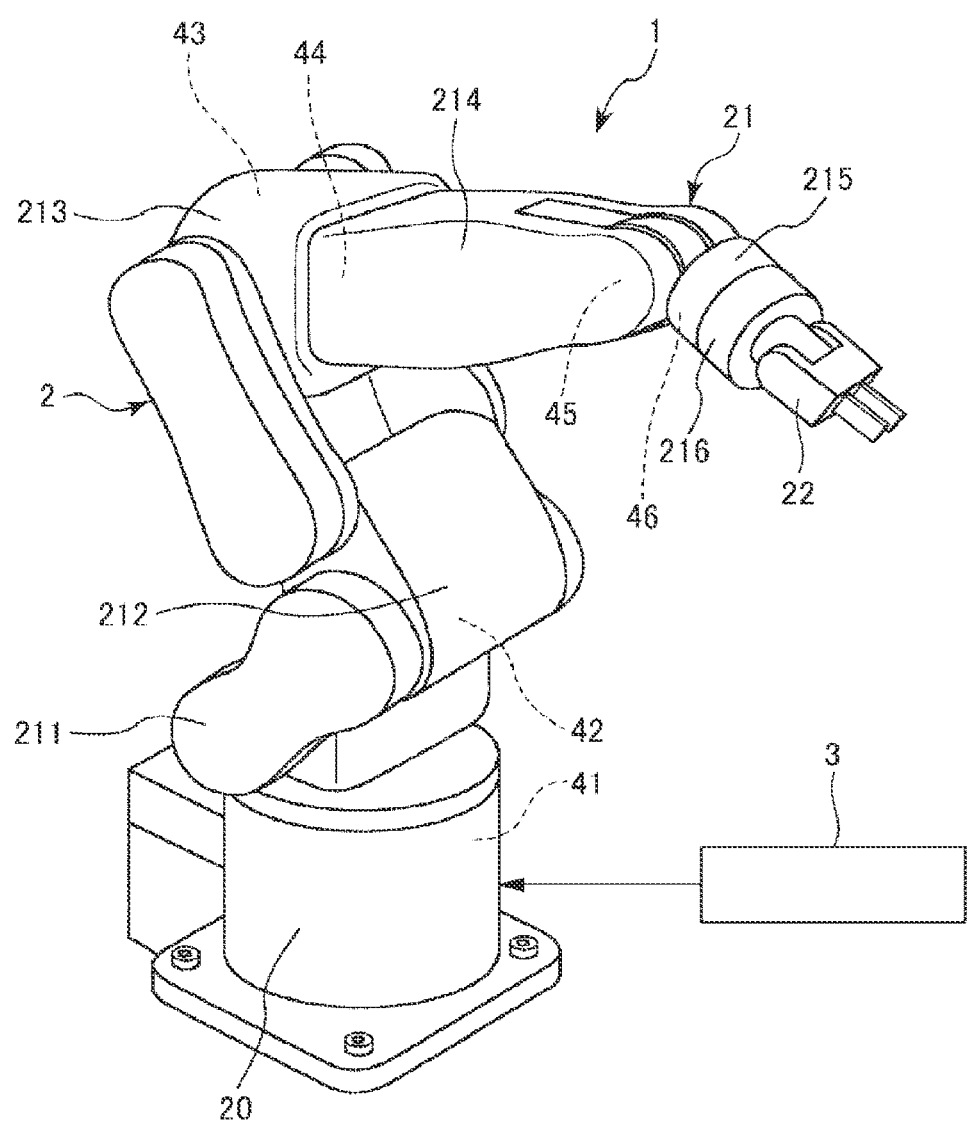
FIG. 1 is an overall view showing a robot system according to an embodiment of the present disclosure.
Figure 2:
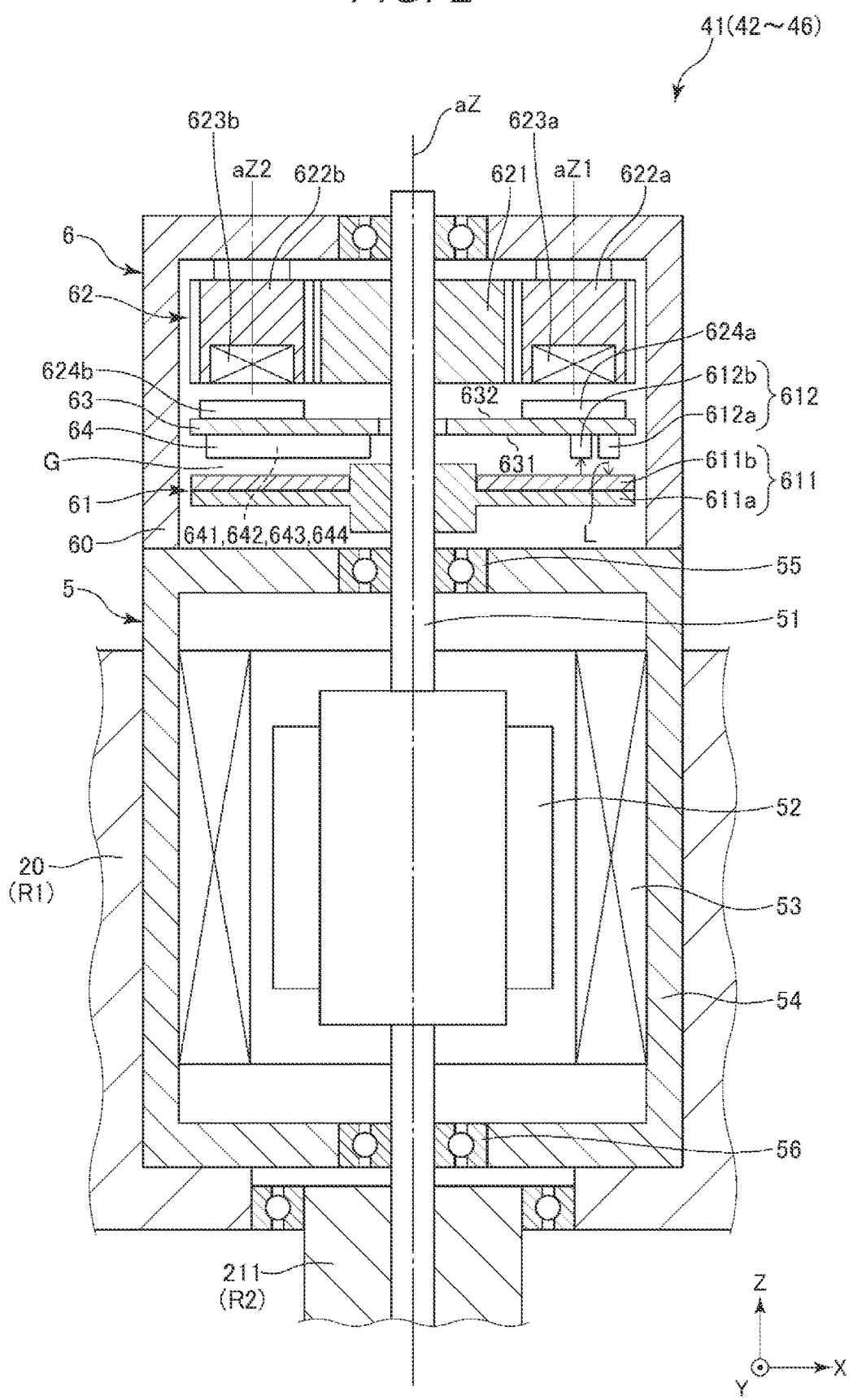
FIG. 2 is a sectional view of a drive device.
Figure 3:
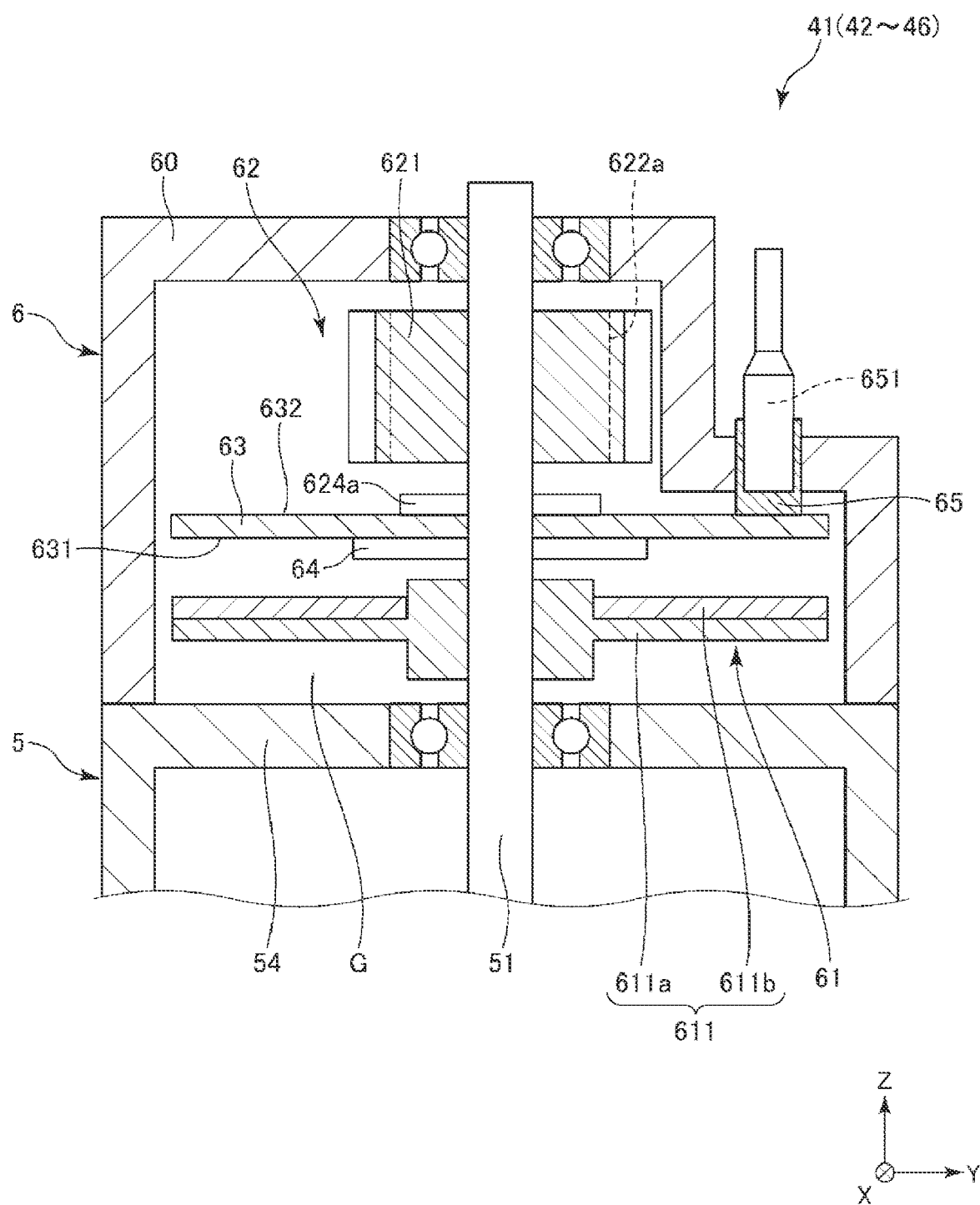
FIG. 3 is a sectional view of the drive device.

FIG. 1 is an overall view showing a robot system according to an embodiment of the present disclosure. FIGS. 2 and 3 are respectively sectional views of a drive device. FIG. 3 is the sectional view formed by rotation of FIG. 2 around a Z-axis by 90°. Hereinafter, for convenience of explanation, three axes orthogonal to one another are an X-axis, a Y-axis, and the Z-axis. The pointer sides of the respective arrows showing the X-axis, the Y-axis, and the Z-axis are "+" and the tail sides are "−". Directions parallel to the X-axis are referred to as "X-axis directions", directions parallel to the Y-axis are referred to as "Y-axis directions", and directions parallel to the Z-axis are referred to as "Z-axis directions". A side in the +Z-axis direction is also referred to as "upper" and a side in the −Z-axis direction is also referred to as "lower".

The robot system 1 shown in FIG. 1 may perform work of feeding, removing, transport, assembly, etc. of precision apparatuses and components forming the apparatuses. The robot system 1 has a robot 2 that executes predetermined work and a control apparatus 3 that controls driving of the robot 2.

The robot 2 is a six-axis robot. The robot 2 has a base 20 fixed to a floor, a wall, a ceiling, or the like, a robot arm 21 supported by the base 20, and an end effector 22 attached to the distal end of the robot arm 21. Further, the robot arm 21 has an arm 211 pivotably coupled to the base 20, an arm 212 pivotably coupled to the arm 211, an arm 213 pivotably coupled to the arm 212, an arm 214 pivotably coupled to the arm 213, an arm 215 pivotably coupled to the arm 214, and an arm 216 pivotably coupled to the arm 215. The end effector 22 is attached to the arm 216.

Note that the configuration of the robot 2 is not particularly limited. For example, the number of arms may be one to five, seven, or more. Or, for example, the robot 2 may be a scalar robot, a dual-arm robot, or the like.

The robot 2 has a drive device 41 that pivots the arm 211 relative to the base 20, a drive device 42 that pivots the arm 212 relative to the arm 211, a drive device 43 that pivots the arm 213 relative to the arm 212, a drive device 44 that pivots the arm 214 relative to the arm 213, a drive device 45 that pivots the arm 215 relative to the arm 214, and a drive device 46 that pivots the arm 216 relative to the arm 215. These drive devices 41 to 46 are respectively independently controlled by the control apparatus 3.

The control apparatus 3 receives a position command from a host computer (not shown) and independently controls driving of the drive devices 41 to 46 so that the respective arms 211 to 216 may be located in positions according to the position command. The control apparatus 3 includes e.g. a computer and has a processor (CPU) that processes information, a memory communicably coupled to the processor, and an external interface. In the memory, various programs that can be executed by the processor are stored. The processor may read and execute the various programs etc. stored in the memory.

Next, the drive devices 41 to 46 will be explained. These have the same configuration as one another, and only the drive device 41 will be representatively explained and the explanation of the other drive devices 42 to 46 will be omitted. As shown in FIG. 2, the drive device 41 has a motor 5 and an encoder unit 6 that detects a rotation state of a rotation shaft of the motor 5.

The motor 5 includes various motors e.g. a two-phase AC brushless motor, a three-phase AC brushless motor, a three-phase synchronous motor, etc. The motor 5 has a rotation shaft 51 placed along an axial line aZ parallel to the Z-axis, a rotor 52 fixed to the rotation shaft 51, a stator 53 placed around the rotor 52, a tubular housing 54 housing these parts and supporting the stator 53, and bearings 55, 56 rotatably supporting the rotation shaft 51 around the axial line aZ relative to the housing 54. Further, the housing 54 is fixed to the base 20 as a first member R1. The arm 211 as a second member R2 is coupled to an end of the rotation shaft 51 at an opposite side to the encoder unit 6. Thereby, the output of the motor 5 is transmitted from the base 20 to the arm 211 and the arm 211 pivots relative to the base 20. Note that the rotation shaft 51 may be coupled to the arm 211 via a gearing such as a reducer as necessary.

The encoder unit 6 is placed at the upside, i.e., the +Z-axis side of the motor 5. The encoder unit 6 has a rotation angle detection optical encoder 61, a multi-rotation detection magnetic encoder 62, and a substrate 63. These parts are housed within a housing 60 fixed to the housing 54. The optical encoder 61, the substrate 63, and the magnetic encoder 62 are sequentially arranged along the Z-axis from the motor 5 side. That is, the optical encoder 61 is located at the most −Z-axis side, the magnetic encoder 62 is located at the most +Z-axis side, and the substrate 63 is located between these encoders.

The optical encoder 61 is a reflective optical encoder and has an optical scale 611 fixed to the rotation shaft 51 of the motor 5, and an optical sensor 612 detecting the rotation state of the optical scale 611. The optical scale 611 rotates around the axial line aZ with the rotation shaft 51. The optical scale 611 has a hub 611a fixed to the rotation shaft 51 of the motor 5 and a disk 611b fixed to the hub 611a. A detection pattern (not shown) for detection of the rotation angle and the rotation speed of the disk 611b is formed on the upper surface of the disk 611b. The detection pattern is not particularly limited to, but includes e.g. a pattern in which two areas having different reflectances of light, i.e., a reflection area and a non-reflection area are alternately arranged along the circumferential direction around the axial line aZ.

The optical sensor 612 is placed apart from the disk 611b at the upside of the disk 611b. The optical sensor 612 has a light emitting device 612a that outputs light L toward the detection pattern on the disk 611b and a light receiving device 612b that receives the light L reflected by the detection pattern. The light emitting device 612a is e.g. a laser diode or a light emitting diode, and the light receiving device 612b is e.g. a photodiode. In the optical encoder 61 having the above described configuration, the waveform of the output signal from the light receiving device 612b changes with the rotation of the disk 611b around the axial line aZ. Accordingly, a rotation angle θ within a 360°-range of the disk 611b may be detected based on the output signal.

The reflective optical encoder is used as the optical encoder 61, and thereby, the configuration thereof is simpler. Because of the reflective type, the light emitting device 612a and the light receiving device 612b may be collectively placed at one side of the optical scale 611 and, for example, compared to a transmissive optical encoder in which the light emitting device 612a and the light receiving device 612b are placed with the optical scale 611 in between and the light receiving device 612b receives the light output from the light emitting device 612a and transmitted through the optical scale 611, the thickness of the optical encoder 61 may be reduced. Note that the optical encoder 61 is not limited to the reflective type, but may be e.g. an imaging optical encoder that detects the rotation angle θ by template matching using an imaging device. In this case, the light emitting device 612a may be used for illumination of the detection pattern and an imaging device such as a camera may be placed in place of the light receiving device 612b.

The magnetic encoder 62 is placed at the upside, i.e., the +Z-axis side of the optical sensor 612. The magnetic encoder 62 has a main gear 621 fixed to the rotation shaft 51, two auxiliary gears 622a, 622b meshing with the main gear 621, magnets 623a, 623b fixed to the auxiliary gears 622a, 622b, and magnetic sensors 624a, 624b detecting the rotation states of the magnets 623a, 623b.

The main gear 621 rotates around the axial line aZ with the rotation shaft 51. The auxiliary gear 622a is rotatably axially supported around an axial line aZ1 parallel to the axial line aZ and rotates to follow the main gear 621 in a rotation amount according to a gear ratio to the main gear 621. Similarly, the auxiliary gear 622b is rotatably axially supported around an axial line aZ2 parallel to the axial line aZ and rotates to follow the main gear 621 in a rotation amount according to a gear ratio to the main gear 621. The numbers of teeth of the main gear 621, the auxiliary gear 622a, and the auxiliary gear 622b are different from one another and particularly have a relatively prime relationship with one another in the embodiment. The auxiliary gears 622a, 622b are placed to face via the main gear 621, and the auxiliary gear 622a is located at the +X-axis side of the main gear 621 and the auxiliary gear 622b is located at the −X-axis side of the main gear 621. Note that the placement of the auxiliary gears 622a, 622b is not particularly limited.

The magnet 623a is fixed to the auxiliary gear 622a. Accordingly, the magnet 623a rotates around the axial line aZ1 with the auxiliary gear 622a. Similarly, the magnet 623b is fixed to the auxiliary gear 622b. Accordingly, the magnet 623b rotates around the axial line aZ2 with the auxiliary gear 622b. The magnets 623a, 623b are permanent magnets e.g. neodymium magnets, ferrite magnets, samarium-cobalt magnets, alnico magnets, bond magnets, or the like, and placed so that directions of magnetic fields may change with rotations around the axial lines aZ1, aZ2.

The magnetic sensors 624a, 624b are placed at the downside, i.e., the −Z-axis side of the magnets 623a, 623b. The magnetic sensor 624a is placed to face the magnet 623a and outputs a signal according to the rotation angle in the direction of the magnetic field of the magnet 623a, i.e., within a 360°-range of the auxiliary gear 622a. On the other hand, the magnetic sensor 624b is placed to face the magnet 623b and outputs a signal according to the rotation angle in the direction of the magnetic field of the magnet 623b, i.e., within a 360°-range of the auxiliary gear 622b. In the magnetic encoder 62 having the above described configuration, a rotation number n of the rotation shaft 51 may be detected by a combination of values of the signals from the magnetic sensors 624a, 624b.

Note that, in the embodiment, the two units including the auxiliary gears, the magnets, and the magnetic sensors are provided, however, the number of units is not limited to that, but may be three or more.

As described above, in the encoder unit 6 having the optical encoder 61 and the magnetic encoder 62, the rotation number n of the rotation shaft 51 of the motor 5 is detected based on the output of the magnetic encoder 62 and the rotation angle θ of the rotation shaft 51 within the 360°-range is detected based on the output of the optical encoder 61. Further, the rotation amount of the rotation shaft 51 may be detected from the rotation number n and the rotation angle θ.

The substrate 63 is placed between the optical encoder 61 and the magnetic encoder 62. Specifically, the substrate 63 is placed between the optical scale 611 of the optical encoder 61 and the magnets 623a, 623b of the magnetic encoder 62. The substrate 63 is a wiring board and fixed to the housing 60. The optical sensor 612 is mounted on a lower surface 631 of the substrate 63 to face the optical sensor 611 and the magnetic sensors 624a, 624b are mounted on an upper surface 632 to face the magnets 623a, 623b. As described above, the optical sensor 612 and the magnetic sensors 624a, 624b are mounted on the single substrate 63, and thereby, the number of substrates is smaller than that of a configuration in which the optical sensor 612 and the magnetic sensors 624a, 624b are mounted on separate substrates in related art, downsizing of the encoder unit 6, particularly, thickness reduction in the Z-axis directions may be realized.

The lower surface 631 is used as the mounting surface for the optical sensor 612 and the upper surface 632 is used as the mounting surface for the magnetic sensors 624a, 624b, that is, the optical sensor 612 and the magnetic sensors 624a, 624b are mounted on the different surfaces, and thereby, interferences between the optical sensor 612 and the magnetic sensors 624a, 624b may be prevented. Accordingly, a higher degree of freedom of design may be exerted.

The optical sensor 612 is mounted on the lower surface 631, and thereby, the optical sensor 612 may be placed in an appropriate position with respect to the optical scale 611. Accordingly, the rotation angle θ of the rotation shaft 51 may be accurately detected. Similarly, the magnetic sensors 624a, 624b are mounted on the upper surface 632, and thereby, the magnetic sensors 624a, 624b may be placed in appropriate positions with respect to the magnets 623a, 623b. Accordingly, the rotation number n of the rotation shaft 51 may be accurately detected.

Further, a circuit element 64 is mounted in a position not overlapping with the optical sensor 612 on the lower surface 631 of the substrate 63. The circuit element 64 is electrically coupled to the optical sensor 612 and the magnetic sensors 624a, 624b. The circuit element 64 is e.g. a microcomputer and has a rotation angle detection circuit 641 detecting the rotation angle θ based on the output signal of the optical sensor 612, a rotation number detection circuit 642 detecting the rotation number n based on the output signals of the magnetic sensors 624a, 624b, a rotation amount calculation circuit 643 calculating the rotation amount of the rotation shaft 51 based on the rotation angle θ detected by the rotation angle detection circuit 641 and the rotation number n detected by the rotation number detection circuit 642, and an interface circuit 644 communicating externally. The circuit element 64 calculates the rotation amount of the rotation shaft 51 on a request from the control apparatus 3 and transmits the amount to the control apparatus 3. As described above, the circuit element 64 is mounted on the lower surface 631, and thereby, the circuit element 64 may be placed in a gap G necessary in view of a structure formed between the optical scale 611 and the substrate 63. Accordingly, the gap G may be effectively utilized and the encoder unit 6 may be downsized.

Note that the configuration of the circuit element 64 is not particularly limited as long as the configuration may output the signal according to the rotation amount of the rotation shaft 51. Or, the circuit element 64 may be omitted, mounted on the upper surface 632 of the substrate 63, or mounted on another part than the substrate 63 inside or outside of the housing.

As shown in FIG. 3, a connector 65 is mounted on the upper surface 632 of the substrate 63. An insertion port 651 of the connector 65 is exposed outside of the housing 60. The control apparatus 3 and the circuit element 64 are electrically coupled via the connector 65. Further, the connector 65 is placed not to overlap with the auxiliary gears 622a, 622b in a plan view from the Z-axis direction. In the embodiment, the auxiliary gears 622a, 622b are placed at the ±X-axis sides with respect to the main gear 621, and the connector 65 is placed at the +Y-axis side with respect to the main gear 621. As described above, the connector 65 is mounted on the upper surface 632 of the substrate 63, and thereby, the insertion port 651 may be easily exposed from the upper surface of the housing 60 so that the insertion port 651 may face the upside, i.e., the +Z-axis side. Accordingly, approach to the insertion port 651 is easier. Particularly, the motor 5 is placed under the encoder unit 6, and the approach to the insertion port 651 is not hindered by the motor 5.

The connector 65 overlaps with the optical scale 611 in the plan view from the Z-axis direction. Thereby, increase in diameter of the encoder unit 6 may be suppressed.

As above, the robot system 1 is explained. The encoder unit 6 applied to the robot system 1 includes the magnetic encoder 62 having the main gear 621 fixed to the rotation shaft 51, the plurality of auxiliary gears 622a, 622b meshing with the main gear 621, the magnets 623a, 623b placed in the auxiliary gears 622a, 622b, and the plurality of magnetic sensors 624a, 624b on which the magnetic fields of the corresponding magnets 623a, 623b act, the optical encoder 61 placed apart from the magnetic encoder 62 in the axial direction of the rotation shaft 51 and having the optical scale 611 fixed to the rotation shaft 51 and the optical sensor 612 receiving the light L reflected by the optical scale 611, and the substrate 63 placed between the magnets 623a, 623b and the optical scale 611 and having the upper surface 632 as one surface with the magnetic sensors 624a, 624b mounted thereon and the lower surface 631 as the other surface with the optical sensor 612 mounted thereon.

As described above, the optical sensor 612 and the magnetic sensors 624a, 624b are mounted on the same substrate 63, and thereby, compared to a configuration in which the optical sensor 612 and the magnetic sensors 624a, 624b are mounted on separate substrates in related art, the number of substrates is reduced, and the encoder unit 6 may be made thinner by the reduction. Further, the optical sensor 612 and the magnetic sensors 624a, 624b are mounted on the different surfaces, and thereby, interferences between these sensors may be prevented. Accordingly, a higher degree of freedom of design may be exerted.

As described above, the magnetic sensors 624a, 624b are mounted on the upper surface 632 as the surface of the substrate 63 at the magnets 623a, 623b side and the optical sensor 612 is mounted on the lower surface 631 as the surface at the optical scale 611 side. As described above, the optical sensor 612 is mounted on the lower surface 631, and thereby, the optical sensor 612 may be placed in an appropriate position with respect to the optical scale 611. Accordingly, the rotation angle θ of the rotation shaft 51 may be accurately detected. Similarly, the magnetic sensors 624a, 624b are mounted on the upper surface 632, and thereby, the magnetic sensors 624a, 624b may be placed in appropriate positions with respect to the magnets 623a, 623b. Accordingly, the rotation number n of the rotation shaft 51 may be accurately detected.

As described above, the encoder unit 6 has the connector 65 mounted on the upper surface 632 as the surface of the substrate 63 at the magnets 623a, 623b side. The connector 65 is provided, and thereby, electrical coupling to the control apparatus 3 is easier. The area of the upper surface 632 not overlapping with the main gear 621 or the auxiliary gears 622a, 622b may be effectively utilized, and the connector 65 may be placed without upsizing of the encoder unit 6.

As described above, the connector 65 overlaps with the optical scale 611 in the plan view of the substrate 63, i.e., the plan view from the Z-axis direction. Thereby, increase in diameter of the encoder unit 6 may be suppressed.

As described above, the encoder unit 6 has the circuit element 64 mounted on the lower surface 631 as the surface of the substrate 63 at the optical scale 611 side and electrically coupled to the optical sensor 612 and the magnetic sensors 624a, 624b. Thereby, the gap G between the lower surface 631 and the optical scale 611 may be effectively utilized and the encoder unit 6 may be downsized.

As described above, the optical sensor 612 is the reflective optical encoder having the light emitting device 612a that radiates the light L toward the optical scale 611 and the light receiving device 612b that receives the light L reflected by the optical scale 611. Thereby, the light emitting device 612a and the light receiving device 612b may be placed at the same side with respect to the optical scale 611 and the thickness of the optical encoder 61 may be reduced.

As described above, the drive device 41 applied to the robot system 1 has the encoder unit 6 and the motor 5 having the rotation shaft 51. Thereby, the effects of the encoder unit 6 may be enjoyed. Accordingly, the drive device 41 may be downsized.

As described above, the motor 5 is placed at the optical scale 611 side of the encoder unit 6. Thereby, coupling to the connector 65 may be made without hindrance by the motor 5. Accordingly, the electrical coupling between the drive device 41 and the control apparatus 3 is easier.

As described above, the robot 2 applied to the robot system 1 has the base 20 as the first member R1, the arm 211 as the second member R2 displaced relative to the first member R1, and the drive device 41 displacing the arm 211 relative to the base 20. Thereby, the effects of the encoder unit 6 may be enjoyed. Accordingly, the robot 2 may be downsized.

As above, the encoder unit, the drive device, and the robot according to the present disclosure are explained based on the illustrated embodiments, however, the present disclosure is not limited to those. The configurations of the respective parts may be replaced by arbitrary configurations having the same functions. Or, any other configuration may be added to the present disclosure. In the above described embodiments, examples in which the encoder unit and the drive device are applied to the robot are explained, however, the encoder unit and the drive device may be applied to other various electronic apparatuses than the robot.

What is claimed is:

1. An encoder unit comprising:
   a magnetic encoder having a main gear fixed to a rotation shaft, a plurality of auxiliary gears meshing with the main gear, magnets placed in the respective auxiliary gears, and a plurality of magnetic sensors on which magnetic fields of the corresponding magnets act;
   an optical encoder placed apart from the magnetic encoder in an axial direction of the rotation shaft and having an optical scale fixed to the rotation shaft and an optical sensor receiving light reflected by the optical scale; and
   a substrate placed between the magnets and the optical scale and having one surface with the magnetic sensors mounted thereon and another surface with the optical sensor mounted thereon.

2. The encoder unit according to claim 1, wherein the magnetic sensors are mounted on a surface of the substrate at the magnets side and the optical sensor is mounted on a surface at the optical scale side.

3. The encoder unit according to claim 1, further comprising a connector mounted a surface of the substrate at the magnets side.

4. The encoder unit according to claim 3, wherein the connector overlaps with the optical scale in a plan view of the substrate.

5. The encoder unit according to claim 1, further comprising a circuit element mounted on a surface of the substrate at the optical scale side and electrically coupled to the optical sensor and the magnetic sensors.

6. The encoder unit according to claim 1, wherein the optical sensor is a reflective optical encoder having a light emitting device that radiates light toward the optical scale and a light receiving device that receives the light reflected by the optical scale.

7. A drive device comprising:
   the encoder unit according to claim 1; and
   a motor having the rotation shaft.

8. The drive device according to claim 7, wherein the motor is placed at the optical scale side of the encoder unit.

9. A robot comprising:
   a first member;
   a second member displaced relative to the first member; and
   the drive device according to claim 7 displacing the second member relative to the first member.

* * * * *